106. COMPOSITIONS, COATING OR PLASTIC.

79   Patented Dec. 5, 1939

2,182,425

UNITED STATES PATENT OFFICE

2,182,425

GLUE AND PROCESS OF MANUFACTURE THEREFOR

Charles N. Cone, Portland, Oreg., assignor to M and M Wood Working Company, Portland, Oreg., a corporation of Oregon No Drawing. Application April 27, 1936, Serial No. 76,605

7 Claims.  (Cl. 134—23.1)

This invention relates to an improved form of animal glue and the process for making and using the same, and relates more particularly to new and improved forms of producing, treating and using animal glue whereby to form bonds therefrom of unusually high tensile strength and hitherto unachieved properties of water resistance.

It is an object of this invention to provide a new form of adhesive derived from animal glue and a new method of producing and using same.

It is another object of this invention to provide a new form of adhesive substance derived from animal glue, which has unusually high tensile strength.

It is a further object of the present invention to provide an adhesive substance derived from animal glue which is water resistant.

It is still another object of the present invention to provide an adhesive substance derived from animal glue which is capable of making a bond which maintains a very high tensile strength in the presence of water and other similar solvents.

It is an additional purpose of the present invention to provide a process for preparing from animal glue an adhesive substance having unusual properties of high tensile strength, and being capable of forming a bond which is resistant to water and similar solvents.

It is an additional object of the present invention to provide a new adhesive derived from animal glue which may be used and applied at ordinary room temperature and may be utilized together with unusually high quantities of water.

It is furthermore a purpose of the present invention to provide a new and useful and remarkably economical process for preparing a new adhesive substance and method for using the same.

Numerous other objects and advantages will become apparent during the progress of the following specification.

Commercial animal glue is prepared by hydrolyzing collagen and collagen-containing substances. As is well known, collagen is found in the sinews, hide and tendons of cattle. These collagen-containing materials, after being appropriately treated to remove some of the grease, hair, dirt, and other foreign substances, are placed in a vat or suitable container and exposed to the action of heat and water.

The collagen contained in the materials is hydrolyzed to form glue or gelatine, which is dissolved in the hot water. This glue solution is drawn off at suitable intervals. As the drawing off continues the solutions contain a progressively poorer quality of glue. This results because the continued action of the heat and water causes continued hydrolysis of the collagen contained in the animal matter.

The highest quality of glue is glue which has not been subjected to hydrolytic action for too long a period of time. Glue, or gelatine, if allowed to hydrolyze for a long period of time would actually be converted to a non-adhesive substance, chemically akin to the peptones. A continued hydrolysis over a long period of time might even reduce the glue or gelatine to water soluble, non-adhesive animo-acids.

It will thus be seen that there are a number of different qualities of animal glue in commerce. The low grade, or "overhydrolyzed" animal glues are very cheap and of poor adhesive qualities.

The present invention deals with the processing of the higher grade, or "shortly hydrolyzed" animal glues. The distinction between low grade and high grade glues on the basis of length of hydrolysis time is one well recognized in the trade. The term "high grade animal glue" is understood to refer only to glue which has not been "overhydrolyzed."

Even the high grade animal glues at present known to commerce do not form water-resistant bonds, nor has it been previously considered possible to make an animal glue which will form a joint that will maintain a high tensile strength in the presence of water. The present invention has accomplished this.

A preferred method of practicing the present invention comprises dissolving a finely divided, high grade animal glue in water. After the solution is perfected it is cooled to about room temperature. A solution of an alkali or alkali-forming substance is prepared and added to the solution of animal glue. To this mixture a suitable quantity of silicate of soda may then be added.

It should be noted that the high grade animal glue used may be also used in flake form, although it has been found that the glue goes into solution more readily when in a more finely divided form.

Various alkalis have been employed with success, such as caustic soda, caustic potash, and hydrated lime.

One preferred formula for carrying out the present invention, which has been found to produce exceedingly satisfactory results, is as follows:

| | Parts |
|---|---|
| Animal glue (grade AA extra) | 100 |
| Water | 700 |
| Caustic soda | 4 |
| Silicate of soda | 50 |

Add the animal glue to approximately 650 parts of the water; warm until glue is dissolved; then cool to about 80° Fahrenheit; add the caustic soda to the balance of the water and when dissolved add solution to solution of glue; to the mixture add the silicate of soda.

In the above formula attention should be given to the relative amounts of caustic soda and sodium silicate present. It is well known that commercial sodium silicate varies somewhat with respect to the amount of excess silica present. The ordinary commercial sodium silicate, which is known as "water-glass," contains approximately two per cent. (2%) by weight of caustic soda. It will be apparent, therefore, that, in the event that a somewhat more alkaline silicate is available, it will be possible to utilize this more alkaline silicate to the exclusion of any caustic soda or other caustic ingredient.

That is, while the composition is operative over a wide range of alkalinity and/or with ordinary water glass alone, nevertheless, the quantity of caustic ingredient must, in cases where it is desired to get a particular alkalinity, be adjusted according to the particular composition of the water glass available.

It has been found that hydrated lime can be substituted for the caustic soda in the above formula with equally good results, in which case it has been found desirable to first suspend the hydrated lime in about four to five parts of water for each part of lime.

Adhesive substances produced in accordance with the present invention have a number of advantages which should be pointed out. It will be noted from a study of the above preferred formulas that the quantity of alkaline chemical compounds used to provide a water resistant adhesive derived from animal glue are lower by far than the amount of alkaline chemical compounds used in other types of adhesive substances, such as casein glue for instance. This advantage may be seen in the application of the present glue to the plywood industry. One of the difficulties with casein and other similar types of water resistant adhesive substances is that the high amount of alkali necessary to form a water resistant bond of satisfactory strength produces chemically deleterious action upon the wood of the panels. This large amount of alkali also causes alkali staining of the panels by reason of the fact that the alkali bleeds through the pores of the wood and comes through on the surface of the panel. In the present invention these difficulties are not encountered.

In addition to the water resistant characteristics of the new adhesive the present process has a further advantage in that the adhesive may be used and applied at ordinary room temperatures whereas in the conventional method of applying ordinary animal glue, the solution must be kept hot. Furthermore in the present process it is possible to use 4 to 8 parts of water for each part of dry glue base whereas in the conventional method of using ordinary animal glue only from 1½ to 2½ parts of water to each part of dry glue base are ordinarily used.

It is to be understood that although some particular compositions embodying the present invention and methods of producing the same have been set forth and discussed above, nevertheless the present invention is not limited to the exact ingredients or proportions, or to the precise methods mentioned, the scope of said invention being commensurate with the following claims.

The invention is hereby claimed as follows:

1. A water resistant adhesive comprising high grade animal glue, water, caustic soda and sodium silicate in substantially the following proportions by weight:

| | Parts |
|---|---|
| High grade animal glue | 100 |
| Water | 700 |
| Caustic soda | 4 |
| Sodium silicate | 50 |

2. The method of preparing a water-proof adhesive from animal glue which consists in dissolving each one hundred parts of the animal glue in from four to eight hundred parts of warm water, cooling the solution to about room temperature, dissolving four parts caustic soda and fifty parts sodium silicate in water, adding the solution of caustic soda and the sodium silicate to the glue.

3. The method of preparing a water-proof adhesive from high grade animal glue which consists in dissolving each one hundred parts of the animal glue in eight hundred parts of warm water, cooling the solution to about room temperature, dissolving four parts caustic soda and fifty parts sodium silicate in water, adding the solution of caustic soda and the sodium silicate to the glue.

4. The method of treating animal glue to form an adhesive suitable for gluing wood and capable of creating a water resistant bond, which consists in dissolving the glue in warm water, cooling the mixture to room temperature, adding water in the proportion of from four to eight parts of water for each one part of animal glue to maintain the glue at a working consistency at room temperature suitable for gluing wood, and adding sodium silicate in sufficient proportion to maintain the adhesive properties of the glue suitable for gluing wood veneers and capable of forming a water resistant bond.

5. The method of treating animal glue to form an adhesive suitable for gluing wood and capable of creating a water resistant bond, which consists in dissolving the glue in warm water, cooling the mixture to room temperature, adding water in the proportion of from four to eight parts of water for each one part of animal glue to maintain the glue at a working consistency at room temperature suitable for gluing wood, and adding an alkali metal silicate in sufficient proportion to maintain adhesive properties of the glue suitable for gluing wood veneers and capable of forming a water resistant bond.

6. A water resistant glue for gluing wood, consisting of animal glue, water at room temperature, and sodium silicate, the proportion of water to animal glue being from four to eight parts of water for each one part of animal glue, the sodium silicate being in sufficient proportion to maintain adhesive properties of the glue when viscous at room temperature suitable for gluing wood veneers and capable of forming a water resistant bond.

7. A water resistant adhesive for gluing wood, consisting of a high grade animal glue, water, and an alkali metal silicate, the proportion of water to animal glue being from four to eight parts of water for each one part of animal glue to maintain the glue at a working consistency at room temperature suitable for gluing wood, the alkali metal silicate being in sufficient proportion to maintain adhesive properties of the glue when viscous at room temperature suitable for gluing wood veneers and capable of forming a water resistant bond.

CHARLES N. CONE.